Jan. 9, 1940.   W. H. FRANK   2,186,377
ELECTRICAL DISTRIBUTION SYSTEM
Filed Dec. 21, 1936
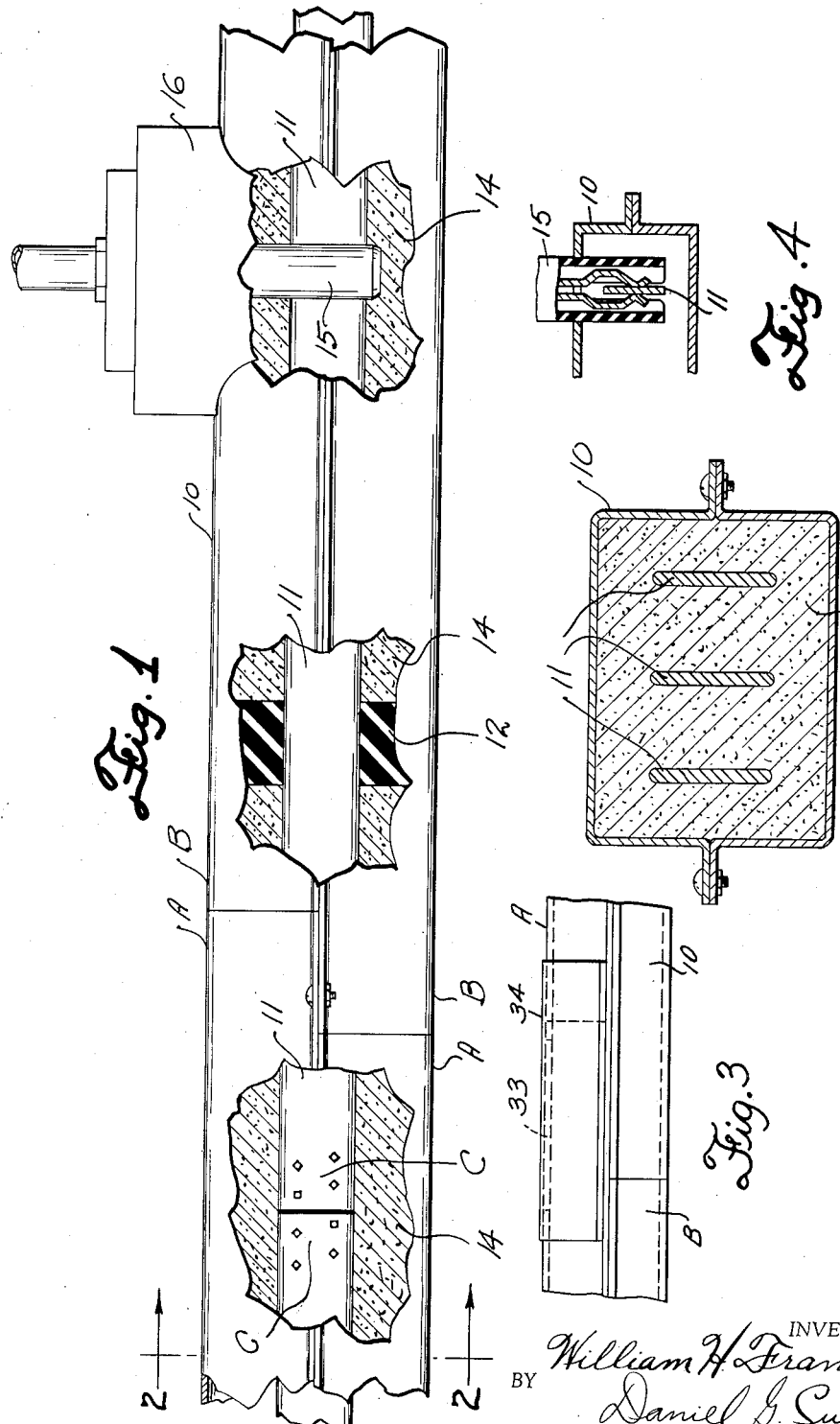
INVENTOR.
William H. Frank
BY Daniel G. Cullen
ATTORNEY.

Patented Jan. 9, 1940

2,186,377

UNITED STATES PATENT OFFICE 2,186,377

ELECTRICAL DISTRIBUTION SYSTEM

William H. Frank, Detroit, Mich.

Application December 21, 1936, Serial No. 116,985

1 Claim. (Cl. 174—72)

This application relates to electrical distribution systems of the bus duct type generally comprising sheet metal casings or ducts in which are enclosed and supported electrical conductors such as bus bars, to which branch circuit connection is made by branch circuit plugs whose prongs enter the duct through openings in the duct.

This application discloses a means for preventing damage due to power arcs in bus duct, one which is such that the arcs are not permitted to form.

The means so developed and shown here comprises a packing of fibrous loose insulating material such as glass wool, rock wool, or the like. This means has been found to provide an effective and economical means for insulating the bus bars from each other and from the enclosing casing and for preventing the formation of power arcs. If such power arcs should start because of breakdowns of the insulating bus bar support or other causes, this same insulating packing will quickly and effectively extinguish the arc before any material damage is done.

The packing herein disclosed is non-combustible and thus eliminates the danger of fires attendent to such arcs in the bus duct system.

The packing method herein disclosed is particularly useful with sectional bus duct systems, where the bus duct is manufactured and sold in sectional lengths with means to couple the sections together to form a complete bus duct run; the packing method herein disclosed for insulating is such that the insulation may be inserted into the bus duct after the system is installed as a whole.

The packing method is also particularly useful where the duct has openings for receiving prong contacts for making contact with the bus bars. The packing herein disclosed is loose and shiftable, thus permitting contact prongs to be inserted through the packing. When a prong is inserted, the insulating material is shifted automatically by the insertion of the prong and permits the prong to make contact with the bus bars. The loose insulating material surrounds the inserted contact prongs and serves to insulate these from one another and from the casing.

An illustration of an arrangement in accordance with the present invention is shown in the appended drawing.

In the drawing, Fig. 1 shows a bus duct containing a packing of loose fibrous insulating material;

Fig. 2 shows the duct in cross section.

Fig. 3 shows the provision of a hand hole and its details of construction;

Fig. 4 shows the cooperation between a plug prong and a bus bar.

Fig. 1 shows a bus duct 10 having therein the bus bars 11 insulatedly supported by a suitable means, such as the insulating support 12. The insulating support herein shown is similar to that shown at 28 in Patent No. 2,041,675. As far as the purpose of this invention the bus bar support may be of any other suitable type. It is understood that the bus bars 11 are of different electrical potentials from one another and from the duct.

The space surrounding and between the bus bars is filled with a loose packing of glass wool, rock wool, shredded asbestos or the like. While this insulating material may be packed into the duct in any density, it is recommended that the insulating material be packed very light or loose. A density of the insulating material of approximately 20% by volume of the air insulating space of the bus duct has been found to be desirable, as this density prevents power arcs from forming, yet allows good heat dissipation and permits ready contact prong insertion. However, the insulation need not be of this particular density, but may be of any desired density, depending a great deal on the type of insulating material used.

Where contact prongs 15 of a plug 16, such as the ones shown at 134, Fig. 5 of Patent No. 2,059,987 of November 3, 1936, have been inserted in the duct, the fibrous insulating packing material 14 is shifted automatically by the insertion of the prongs, and surrounds the contact prongs 14 and insulates them as well as maintaining the insulation in the bus duct.

Figure 1 shows two bus duct sections A and B of the type shown in Patent No. 2,041,675 and illustrates the packing around the joint C—C between the bus bars. The packing of insulating material may be introduced into the duct through suitable hand-hole openings such as the ones shown at 33, which have covers like the ones shown at 34. After the packing is introduced the hand-hole cover is replaced on the bus duct section.

The packing may be introduced into the duct after the system is erected; in the case of a duct of the sectional cell type construction of Patent No. 2,041,675, it may be introduced into the cells prior to the erection of the system, and at the time the system is being installed and the joints made, the insulation may be introduced into the joints.

The packing is not affected by the expansion and contraction of the bus bars and the bus duct and will not crack or strain under mechanical stress due to short circuits or overloads on the bus bars.

Packing as an insulation in bus duct is superior to oil as it has practically all of the elasticity of oil and provides the electrical advantages of oil; furthermore it does not have the heat confining characteristics of oil, is considerably less costly than oil, and unlike oil, which is not practical for use in duct having many openings and leakage holes, the packing is practical for use in sheet metal duct, even though the latter has openings and unsealed joints.

The packing has been found effective in preventing the breakdown of the air dielectric around the bus bars. It has been found that the presence of only a small proportion of conductive material or metallic vapors, formed by arcing in the air dielectric, causes a breakdown thereof and it has been observed that the presence of the packing prevents the formation of a clear, free, unobstructed path for the flow of such metallic vapors between the bus bar and between them and the duct. In addition, the packing tends to break up the electrostatic field between the bus bars and the duct and tends to deionize conductive gases within the duct.

I claim:

In an electrical distribution system of the character described, namely a sectional bus duct made up of sections joined end to end by unsealed joints which are not liquid tight, each section comprising a length of sheet metal duct containing lengths of bus bars, the sections having prong access openings through which may be plugged bus bar engaging prongs and containing bus bar supports of insulation shaped to form barriers in the duct and divide the duct into compartments, and hand hole openings near the ends of the sections providing access into the sections at their ends for splicing, a relatively loose and light packing of comminuted finely divided non-liquid electrical insulation material around and between the bus bars and the duct, the packing being heavy enough to prevent arcs and not to flow freely past the barriers, light and fluent enough to shift itself readily and automatically by the plugging in of prongs through the prong access openings, and thus to permit such plugging in and to bare spots of the bus bars, and fine and fluent enough to be introduceable into the duct after the sections are joined end to end by being poured through the hand hole openings and when introduced into the duct to flow away from the hand hole openings and fill the duct.

WILLIAM H. FRANK.